United States Patent [19]

Namiki

[11] 4,147,832
[45] Apr. 3, 1979

[54] FIXING ROLLER

[75] Inventor: Ryoichi Namiki, Hino, Japan

[73] Assignee: Ricoh Company, Ltd., Tokyo, Japan

[21] Appl. No.: 832,607

[22] Filed: Sep. 12, 1977

[30] Foreign Application Priority Data

Sep. 22, 1976 [JP] Japan ................. 51-114072

[51] Int. Cl.² ............... B32B 15/06; B32B 25/20
[52] U.S. Cl. ........................... 428/375; 428/357;
428/376; 428/380; 428/383; 428/390; 428/391
[58] Field of Search ............ 428/357, 364, 375, 379,
428/391, 446, 447, 448, 380, 382, 383, 390, 398,
376; 29/130

[56] References Cited

U.S. PATENT DOCUMENTS

| 2,113,724 | 4/1938 | Freedlander et al. | 428/375 |
| 3,398,043 | 8/1968 | Youngs | 428/447 |
| 3,435,500 | 4/1969 | Aser et al. | 156/86 X |
| 3,686,731 | 8/1972 | Koori | 428/447 |
| 3,749,617 | 7/1973 | Fountain et al. | 428/447 |
| 3,997,691 | 12/1976 | Murphy | 428/447 |

Primary Examiner—Lorraine T. Kendell
Attorney, Agent, or Firm—Cooper, Dunham, Clark, Griffin & Moran

[57] ABSTRACT

A fixing roller which is constructed by bonding in layers a heat resistant adhesive layer, a heat and oil resistant layer, a heat and oil resistant adhesive layer and an offset preventing layer to a core, wherein the offset preventing layer is formed before the solvent of the heat and oil resistant adhesive layer has been completely evaporated, and at least one component material of the heat and oil resistant adhesive layer is of a kind similar to the component materials of both the heat and oil resistant elastic layer and the offset preventing layer so that the peeling off of the offset preventing layer is obviated.

3 Claims, 1 Drawing Figure

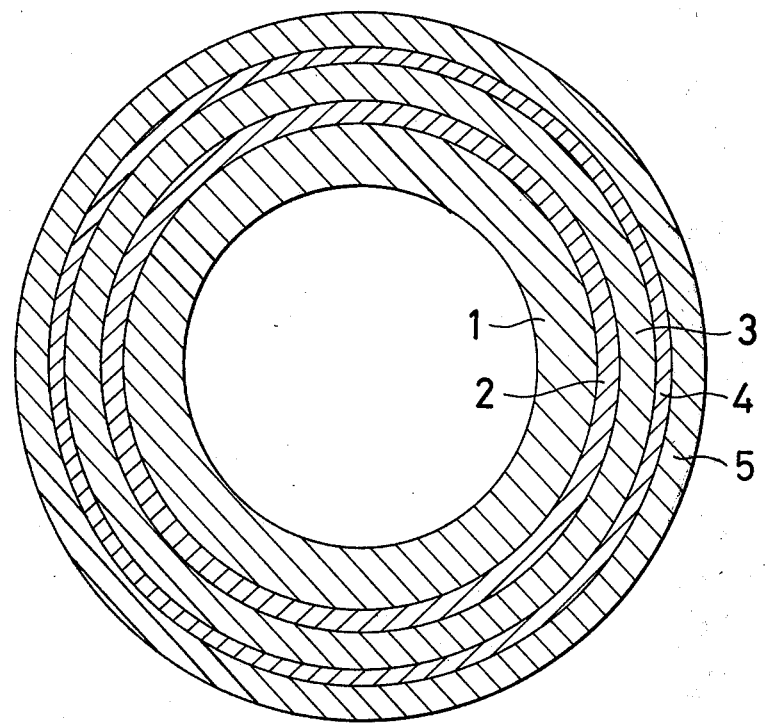

FIXING ROLLER

BACKGROUND OF THE INVENTION

This invention relates to a roller for fixing toner images deposited on a photosensitive paper or transfer paper by heat fusing.

The conventional fixing roller which is formed by bonding in layers a heat resistant adhesive layer, a heat and oil resistant elastic layer and an offset preventing layer to the outer surface of a core, and other conventional fixing roller which is formed by bonding in layers a heat resistant adhesive layer, a heat resistant elastic layer, an adhesive layer of being both oil resistant and adhesive, and an offset preventing layer to the outer surface of a core, has a shortcoming of the offset preventing layer easily peeling off the heat resistant elastic layer since the offset preventing layer is prone to be caused to swell by an offset preventing oil which is coated on the outer surface of the offset preventing layer.

SUMMARY OF THE INVENTION

It is therefore an object of the invention to provide a fixing roller which is capable of removing the above-mentioned shortcoming.

In a fixing roller according to the present invention, the following are bonded to a core in layers in the following order: a heat resistant adhesive layer, a heat and oil resistant elastic layer, a heat and oil resistant adhesive layer, and an offset preventing layer.

The offset preventing layer on the heat and oil resistant adhesive layer is formed before the solvent of the heat and oil resistant adhesive layer has been evaporated. Furthermore, at least one component of the heat and oil resistant adhesive layer is similar in properties to the components of said heat and oil resistant elastic layer and the offset preventing layer.

The fixing roller according to the present invention has a feature that the offset preventing layer does not peel off since it is caused to adhere strongly to the heat and oil resistant elastic layer through the heat and oil resistant adhesive layer.

BRIEF DESCRIPTION OF THE DRAWING

The FIGURE is a transverse sectional view of one embodiment of the fixing roller according to the present invention.

DETAILED DESCRIPTION OF THE PREFERRED EMBODIMENT

In a fixing roller according to the invention, $1\mu$ to $500\mu$ thick heat resistant adhesive layer 2 is formed on the outer surface of a core 1, and on the outer surface of the heat resistant adhesive layer 2 is formed $1\mu$ or thicker heat and oil resistant elastic layer 3, and on the outer surface of the layer 3 is formed $1\mu$ or thicker heat and oil resistant adhesive layer 4, and on the outer surface of the heat and oil resistant adhesive layer 4 is formed $1\mu$ or thicker offset preventing layer 5 before the solvent of the adhesive layer 4 is completely evaporated, and of the component materials which make up the heat and oil resistant adhesive layer 4, at least one component material is of a kind similar to the materials which make up the heat and oil resistant elastic layer 3 and the offset preventing layer 5.

The core 1 is made of iron, copper, stainless steel, aluminium or glass in a hollow cylindrical shape or in a solid cylindrical shape as shown in the FIGURE.

The heat resistant adhesive layer 2 can be made of adhesives for use with silicone resin base elastic materials or fluorine containing materials, adhesives for use with resin base elastic materials, or adhesives for use with rubber base elastic materials for the like. However, of these adhesives, the adhesives for use with rubber base elastic materials, such as silastic 733 and silastic 142 (commercial name), are preferable.

The heat and oil resistant elastic layer 3 is composed of silicone fluoride rubber, and fluorine-contained rubber, such as silastic LS-63U and 3M-made Viton. The heat and oil resistant adhesive layer 4 is composed of silastic 733, silastic 142, silastic LS-63U (commercial name) or fluorine base elastic materials dissolved in an organic solvent, such as toluene and ethyl acetate. Ordinary silicone rubber is not resistant to silicone oil. Silicone fluoride rubber and fluorine base rubber are resistant to silicone oil, while ordinary silicone rubber is resistant to silicone fluoride oil and fluorine-contained oil or the like. Also ordinary silicone rubber is oil resistant to fatty acid modified silicone oil containing ordinary vegetable oil, ethylene glycol, propylene glycol or carboxylic acid modified silicone oil.

The offset preventing layer 5 is composed of room temperature vulcanized silicone rubber, for example, KE 12 and KE 112 (commercial name) dissolved in the organic solvent. Both types of room temperature vulcanized rubbers, namely bond-type and addition-type, can be used equally.

The heat resistant adhesive layer 2, the heat and oil resistant elastic layer 3 and the heat and oil resistant adhesive layer 4 are formed by spraying the respective materials thereof on a supporting member or by immersing the supporting member in the respective materials. The heat and oil resistant elastic layer 3 can be formed by ordinary press vulcanization or a mold method emploing room temperature vulcanized silicone rubber. The offset preventing layer 5 is formed by coating component materials thereof or by pouring the materials into a given cavity before the solvent of the heat and oil resistant adhesive layer 4 is completely evaporated, followed by air drying or heating. When the above mentioned heat and oil resistant adhesive layer 4 is composed of silastic 733 or silastic 142 (commercial name), and the offset preventing layer 5 is composed of silicone rubber, the offset preventing layer 5 must be formed in ordinary atmosphere within 24 hours, preferably in 1 to 5 hours, after the heat and oil resistant adhesive layer 4 has been formed.

For example, when the heat and oil resistant adhesive layer 4 is approximately $100\mu$ thick and it is dried by air drying in ordinary atmosphere, it is necessary to form the offset preventing layer 5 within 24 hours after the heat and oil resistant adhesive layer 4 has been formed. Furthermore, when approximately $100\mu$ thick heat and oil resistant adhesive layer 4 is heated to dryness, it is necessary to form the offset preventing layer 5 within less than 24 hours after the heat and oil resistant adhesive layer has been formed.

The reason why the above-mentioned method is adopted is that even if the heat and oil resistant elastic layer 3 is formed by utilizing silicone fluoride rubber, and the offset preventing layer 5 is formed by coating room temperature vulcanized silicone rubber on the outer surface of the layer 3, the offset preventing layer 5 does not adhere to the heat and oil resistant elastic layer 5 at all. Furthermore, when, silicone rubber, which is not resistant to silicone oil, is dissolved in the solvent and coated as an adhesive, on the heat and oil resistant elastic layer 3, and the offset preventing layer 5 is formed thereon, the offset preventing layer 5 adheres very well. However, when an oil for offset prevention permeates the above-mentioned adhesive layer, the offset preventing layer 5 peels off.

A belt-shaped member can be used as a supporting member 1 for the above-mentioned layers.

EXAMPLE 1

Heat resistant adhesive layer 2 was formed on a roll-shaped core by employing silastic 733 (commercial name), and then heat and oil resistant elastic layer 3 was formed thereon by ordinary press vulcanization employing silicone fluoride rubber or silastic LS-63U, and on the layer 3 was formed heat and oil resistant adhesive layer 4 by employing silastic 733 dissolved in the organic solvent. In approximately one hour, offset preventing layer 5 was formed by employing KE 12 dissolved in the orginaic solvent, followed by air drying for not less than 24 hours. The offset preventing layer did not peel off the thus prepared roller even if the roller was heated to 200° C. and was coated with a silicone oil (commercial name KF 96) for preventing offset.

EXAMPLE 2

As in Example 1, heat resistant adhesive layer 2, and heat and oil resistant elastic layer 3 were formed. Then heat and oil resistant adhesive layer 4 was formed by employing silastic L8-63U dissolved in the organic solvent. As in Example 1, when the thus prepared roller was heated to 200° C. and coated with KF 96, the offset preventing layer 5 did not peel off.

What is claimed is:
1. A fixing roller comprising a core, and progressing outwardly from said core, a first layer which is a heat resistant adhesive layer, a second layer which is a heat and oil resistant elastic layer, a third layer which is a heat and oil resistant adhesive layer, and a fourth layer which is an offset preventing layer, wherein said fourth layer comprises a room temperature vulcanized silicone rubber, and said third layer comprises a fluorine base silicone rubber, and said second layer comprises a rubber selected from the group consisting of silicone fluoride rubber and fluorine-containing rubber.
2. A fixing roller as claimed in claim 1, wherein said second layer rubber is a silicone fluoride rubber.
3. A fixing roller as claimed in claim 1, wherein said second layer rubber is a fluorine-containing rubber.

* * * * *